US008564728B2

(12) United States Patent
Petersson et al.

(10) Patent No.: US 8,564,728 B2
(45) Date of Patent: Oct. 22, 2013

(54) GESTURE-BASED CONTROL OF IPTV SYSTEM

(75) Inventors: Justus Petersson, Hässelby (SE); Mats Cedervall, Härnösand (SE); Robert Skog, Hässelby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 52 days.

(21) Appl. No.: 13/227,386

(22) Filed: Sep. 7, 2011

(65) Prior Publication Data

US 2012/0057081 A1 Mar. 8, 2012

Related U.S. Application Data

(60) Provisional application No. 61/380,774, filed on Sep. 8, 2010.

(51) Int. Cl.
 *H04N 5/44* (2011.01)
(52) U.S. Cl.
 USPC .......................................... 348/734; 348/552
(58) Field of Classification Search
 USPC .......... 348/734, 739, 552, 725; 345/173, 156, 345/169, 158
 See application file for complete search history.

(56) References Cited

U.S. PATENT DOCUMENTS

| | | | |
|---|---|---|---|
| 6,191,773 B1 | 2/2001 | Maruno et al. | |
| 7,339,580 B2 * | 3/2008 | Westerman et al. | 345/173 |
| 7,340,077 B2 * | 3/2008 | Gokturk et al. | 382/103 |
| 7,812,826 B2 | 10/2010 | Ording et al. | |
| 7,966,578 B2 | 6/2011 | Tolmasky et al. | |
| 2003/0156756 A1 | 8/2003 | Gokturk et al. | |
| 2005/0104867 A1 | 5/2005 | Westerman et al. | |
| 2008/0036743 A1 | 2/2008 | Westerman et al. | |
| 2009/0073136 A1 | 3/2009 | Choi | |
| 2009/0153289 A1 | 6/2009 | Hope et al. | |
| 2010/0039375 A1 | 2/2010 | Huang et al. | |
| 2010/0251116 A1 | 9/2010 | Rimas-Ribikauskas et al. | |

FOREIGN PATENT DOCUMENTS

| | | |
|---|---|---|
| EP | 2166444 A2 | 3/2010 |
| WO | 2009/109014 A1 | 9/2009 |
| WO | 2009/134194 A1 | 11/2009 |
| WO | 2010016836 A1 | 2/2010 |

OTHER PUBLICATIONS

EPO, Int'l Search Report in PCT/IB2011/002504, Apr. 19, 2012.
EPO, Written Opinion in PCT/IB2011/002504, Apr. 19, 2012.
Purcher, Apple Working on Simplifying Multi-Touch Gesturing, Patently Apple, Apr. 12, 2011.

* cited by examiner

*Primary Examiner* — Trang U Tran
(74) *Attorney, Agent, or Firm* — Potomac Patent Group PLLC

(57) ABSTRACT

Methods and apparatus for controlling an Internet Protocol Television (IPTV) system by gestures on a remote control involve determining a number of fingers touching a screen of the remote control; identifying at least one characteristic of movement by the fingers; based on the number determined and at least one characteristic identified, finding a corresponding predefined gesture in a set of predefined gestures; and based on the gesture found, generating a corresponding control command to be sent to the IPTV system.

21 Claims, 5 Drawing Sheets

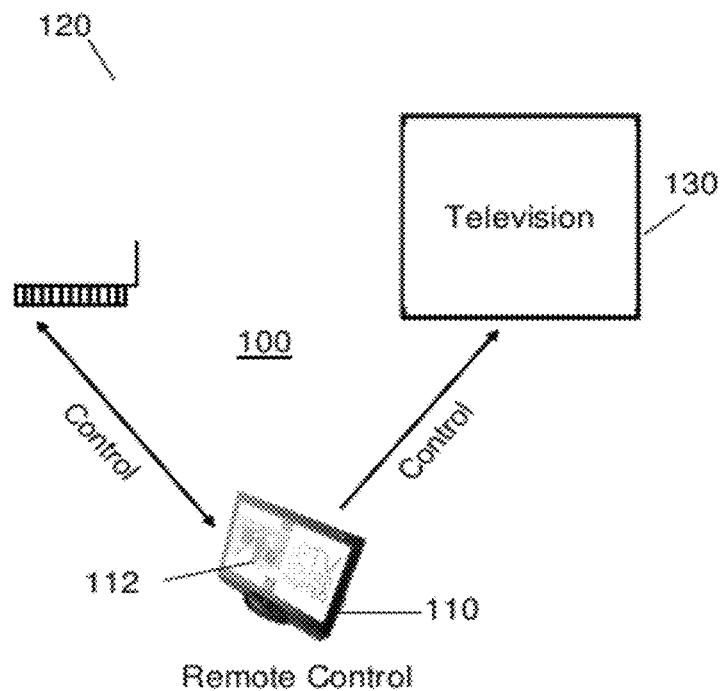
FIG. 1
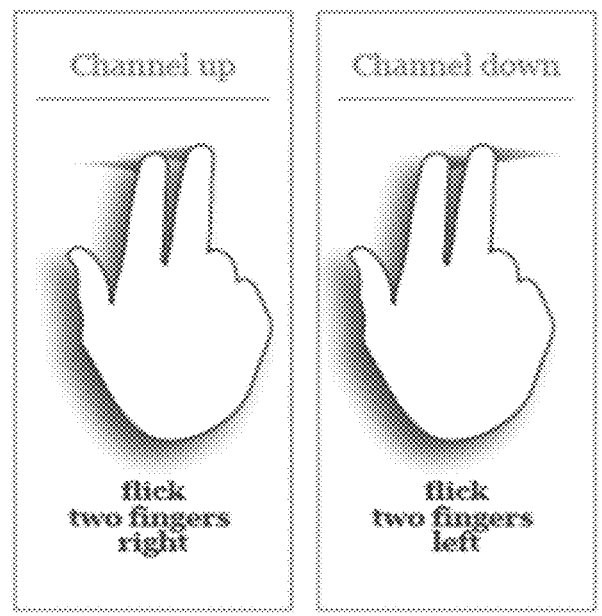
FIG. 2A                    FIG. 2B

GESTURE-BASED CONTROL OF IPTV SYSTEM

This application claims the benefit of the filing date of U.S. Provisional Patent Application No. 61/380,774 filed on Sep. 8, 2010, which is incorporated by reference in this application.

TECHNICAL FIELD

This invention relates to remotely controllable Internet Protocol Television (IPTV) systems and more particularly to wireless touch-screen devices for remotely controlling IPTV systems.

BACKGROUND

Many IPTV systems today are based on a Graphical User Interface (GUI) that is displayed on the TV and controlled by a remote control. The remote control normally emits simple key-commands over infrared (IR) or radio signals, e.g., KEY_1, KEY_UP, KEY_OK, etc. The aforementioned GUIs are normally implemented in a set-top box (STB) or the TV, and are either a thin client or thick client. Thin clients normally use web-technologies, such as hypertext markup language (HTML), scalable vector graphics (SVG), or Adobe Flash. A normal GUI of an IPTV system is inherently limited by these key-commands and the fact that the GUI is displayed only on the TV.

An IPTV uses web browser technology to enable IPTV Service Providers to provide media services deployed in communication networks, such as wired and wireless telephone networks. In general, and as described for example in International Publications WO 2010/016836 and WO 2009/134194, IPTV is a system for receiving and displaying multimedia streams encoded as series of IP data packets. Work on IPTV is underway in several contexts, including for example the Open IPTV Forum, which is specifying an end-to-end platform for supplying multimedia and IPTV services to user equipments (UEs) over the Internet and managed networks having controlled quality-of-service (QoS) performance. A version 2 specification of an IPTV architecture is available at www.openiptvforum.org, and the architecture uses the IP Multimedia Subsystem (IMS) that is specified by the Third Generation Partnership Project (3GPP). A UE can access services offered through an IMS in many ways, both wireline (e.g., Ethernet, cable modem, digital subscriber line, etc.) and wireless (e.g., 3GPP-specified cellular radio, IEEE 802.11, IEEE 802.16, etc.).

The IMS is specified in for example 3GPP Technical Specification (TS) 23.228 V8.4.0, IP Multimedia Subsystem (IMS) Stage 2 (Release 8), March 2008, and other versions of TS 23.228. IMS is described in, for example, R. Noldus et al., "Multi-Access for the IMS Network", *Ericsson Review* No. 2, pp. 81-86 (2008); U. Olsson et al., "Communication Services—The Key to IMS Service Growth", *Ericsson Review* No. 1, pp. 8-13 (2008); and P. Arberg et al., "Network Infrastructure for IPTV", *Ericsson Review* No. 3, pp. 79-83 (2007). Approaches to IMS-based IPTV are described in M. Cedervall et al., "Open IPTV Forum—Toward an Open IPTV Standard", *Ericsson Review* No. 3, pp. 74-78 (2007), and T. Cagenius et al., "Evolving the TV experience: Anytime, Anywhere, Any Device", *Ericsson Review* No. 3, pp. 107-111 (2006).

The IMS in 3GPP networks uses the Session Initiation Protocol (SIP) and the Session Description Protocol (SDP) as its basic signaling mechanisms. SIP is a mechanism defined in Request for Comment (RFC) 3261 by the Internet Engineering Task Force (IETF) for finding endpoints and routing control signals between them and is a set of simple operations, including REGISTER, INVITE, ACK, and BYE. SDP is a protocol for declaring media. In IMS networks, media transport is based on the real-time transport protocol (RTP), among others. 3GPP TS 24.229 V7.11.0, IP Multimedia Call Control Protocol Based on Session Initiation Protocol (SIP) and Session Description Protocol (SDP), Stage 3, Release 7 (March 2008) specifies an IP Multimedia Call Control Protocol based on SIP and SDP. Section 5 of TS 24.229 specifies SIP usage at a UE, and Section 6 of TS 24.229 specifies SDP usage.

For a UE, which for IPTV can be an STB or a TV having integrated STB capabilities, to access an IMS and IPTV services, the UE registers in a serving call session control function (S-CSCF), which is an IMS core node and is in essence a SIP server. The IMS also includes a number of access nodes, including a proxy CSCF (P-CSCF), a media gateway control function (MGCF), and one or more border gateways (BGs), that mediate UE access to the core nodes and through them to content residing on media servers. The UE may include an IP multimedia subscriber identity module (ISIM), which is an application, or computer program, residing on a universal integrated circuit card (UICC) that enables the UE to register and access the IMS. The ISIM is typically preconfigured with parameters necessary to initiate the UE's registration to the IMS, including a private user identity, one or more public user identities, and a home network domain name.

Touch-screen devices and more recent multi-touch-screen devices, such as the iPad available from Apple Inc. and many other tablet, netbook, and other computers available from many manufacturers, have become increasingly popular and are beginning to be configured as remote controls for user's electronic devices.

U.S. Pat. No. 7,339,580 to Westerman et al. states that it discloses apparatus and methods for simultaneously tracking multiple finger and palm contacts as hands approach, touch, and slide across a proximity-sensing, compliant, and flexible multi-touch surface that consists of compressible cushion dielectric, electrode, and circuitry layers.

User gestures have been used to control electronic devices. For example, U.S. Pat. No. 7,340,077 to Gokturk et al. states that three-dimensional position information obtained with a camera is used to identify the gesture created by a user's body part of interest. At one or more instances of an interval, the posture of a body part is recognized based on the part's shape, position, and orientation. The posture of the body part over the instances is recognized as a combined gesture, and the gesture is classified for determining an input into a related electronic device.

For another example, U.S. Pat. No. 6,191,773 to Maruno et al. states that it relates to an interface apparatus for making input and output of appliances. The interface apparatus includes means for recognizing the shape or move of the hand of an operator, means for displaying the features of the shape or move of the hand recognized as a special shape on a screen, and means for controlling the information displayed on the screen by the special shape. Different user hand shapes or moves can select different user electronic devices.

Currently, it is not possible for a user to control an IPTV system with gestures.

SUMMARY

In accordance with aspects of this invention, there is provided a method of controlling an Internet Protocol Television (IPTV) system by gestures on a remote control. The method includes determining a number of fingers touching a screen of the remote control; identifying at least one characteristic of action by the fingers; mapping at least one identified characteristic of action by the fingers to a corresponding predefined gesture in a set of predefined gestures; and based on the gesture mapped, generating a corresponding control command to be sent to the IPTV system.

Also in accordance with aspects of this invention, there is provided a remote control for controlling an IPTV system. The remote control includes a touch-sensitive screen; a programmable electronic processor in communication with the touch-sensitive screen; and a transceiver in communication with the programmable electronic processor. The processor is configured to determine a number of fingers touching the touch-sensitive screen, to identify at least one characteristic of action by the fingers touching the screen, to map at least one identified characteristic of action by the fingers to a corresponding predefined gesture in a set of predefined gestures, and to generate based on the mapped gesture a corresponding control command.

Also in accordance with aspects of this invention, there is provided a computer-readable medium having non-transitory stored instructions that, when executed by a computer, cause the computer to carry out a method of controlling an IPTV system by gestures on a remote control. The method includes determining a number of fingers touching a screen of the remote control; identifying at least one characteristic of action by the fingers; mapping at least one identified characteristic of action by the fingers to a corresponding predefined gesture in a set of predefined gestures; and based on the gesture mapped, generating a corresponding control command to be sent to the IPTV system.

Among the many advantages provided by this invention, a user can control an IPTV system with gestures conveniently and comfortably, in contrast to previous devices and methods.

BRIEF DESCRIPTION OF THE DRAWINGS

The several features, objects, and advantages of this invention will be understood by reading this description in conjunction with the drawings, in which like reference characters indicate like parts and:

FIG. 1 depicts an exemplary arrangement of a remote control and an IPTV system (for simplicity, an IPTV server and a TV);

FIGS. 2A, 2B depict exemplary gestures on a remote control for controlling an IPTV system;

DETAILED DESCRIPTION

In this description, the term "remote control" means any kind of device that has a touch-sensitive screen and programmable digital signal processor and that is used to control the operation of another electronic device by sending one or more appropriate commands directly, e.g., by line-of-sight (such as IR) or RF signals, or indirectly, e.g., by wired or wireless Ethernet (IP) or other network signals, to the other electronic device.

FIG. 1 depicts an example communication network 100 that includes a remote control 110 and an IPTV system that is represented by an IPTV Server 120 and a TV 130. The artisan will understand that many other electronic devices can be included in the network 100. As depicted in FIG. 1, the remote control 110 wirelessly transmits control signals to the TV 130 and/or the IPTV Server 120. The IPTV Server 120 can in turn exchange control signals with the TV 130. A user of the remote control 110 indicates a command or other control signal to be transmitted by a corresponding gesture on a suitable touch- or proximity-sensitive screen 112 of the remote control 110. Suitable touch-screens 112 are commercially available from LG Display Co., Ltd., Seoul, Korea; Seiko Epson Corp., Nagano, Japan; and Prime View International Co., Ltd., Hsinchu, Taiwan; among other manufacturers, and are familiar from many commercially available devices, such as the iPad devices made by Apple Inc., Cupertino, Calif., and the Galaxy Tab available from Samsung Electronics America, Ridgefield Park, N.J.

For example, the remote control 110 can be configured such that a user's touching the screen 112 with the tip or tips of one or more fingers and flicking, or quickly sliding, the finger or fingers to the left or right are gestures that change the selected channel on the TV 130. A finger flick to the right can be called a "channel up" gesture, and a finger flick to the left can be called a "channel down" gesture.

For example, as depicted in FIG. 2A, a channel-up gesture with two fingers, such as the index and middle fingers, can select the next-higher channel on the TV 130, and as depicted in FIG. 2B, a channel-down gesture with two fingers can select the next-lower channel on the TV 130.

Figure 3A:
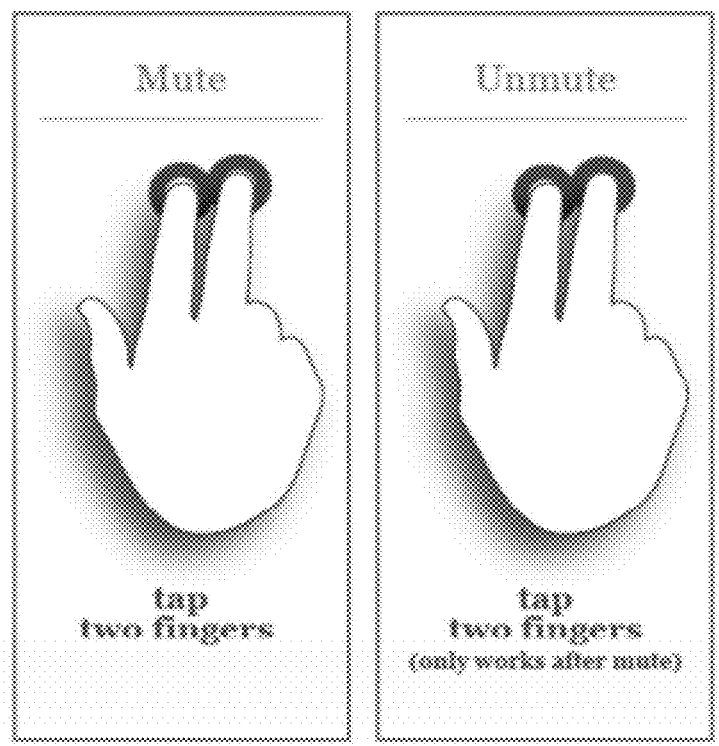
FIGS. 3A, 3B, 3C, 3D, 3E depict other exemplary gestures on a remote control for controlling an IPTV system.

For another example, as depicted in FIG. 3A, a mute/unmute gesture has the remote control 110 configured such that a user's tapping the screen 112 with two fingertips, such as the tips of the index and middle fingers, toggles the audio on the TV 130 between mute (off) and unmute (on).

Figure 3B:
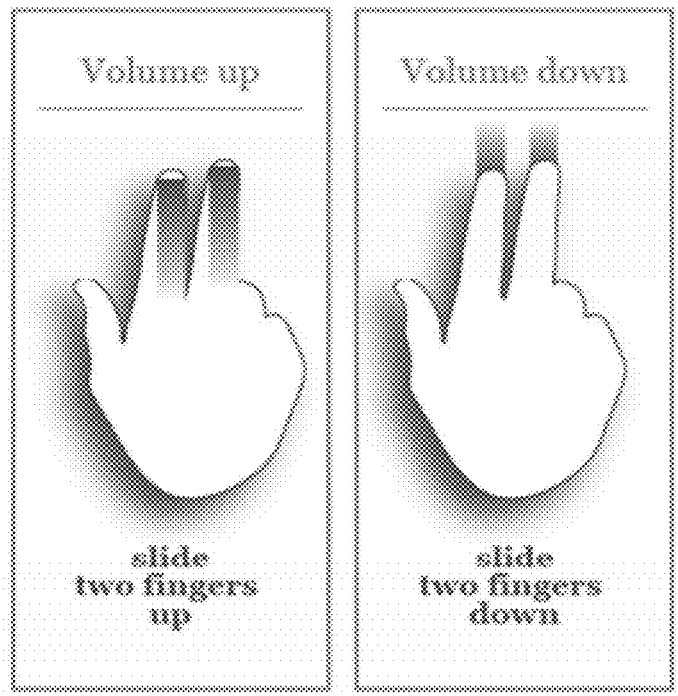
Figures 3C, 3D, 3E:
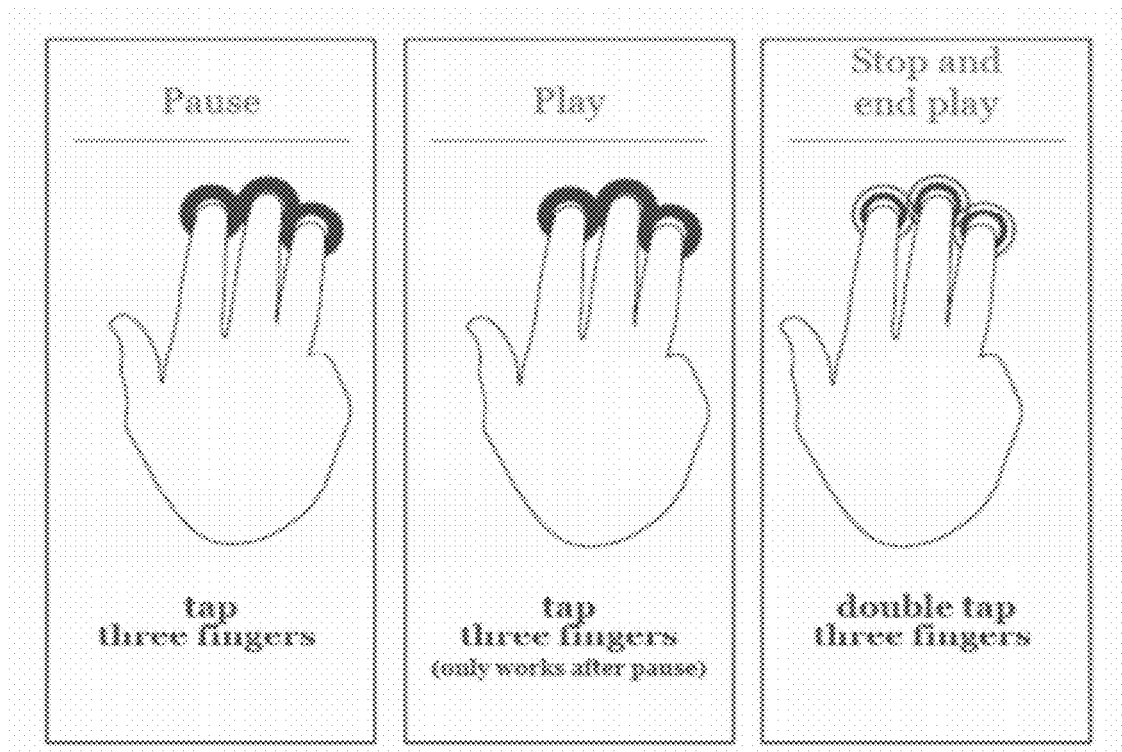

For yet other examples, as depicted in FIGS. 3B and 3C, the remote control 110 can be configured such that a user's touching the screen 112 with two fingertips and sliding the fingers upwardly along the screen is a volume-up gesture that increases the audio volume level of the TV 132 (FIG. 3B) and that sliding the fingers downwardly along the screen is a volume-down gesture that decreases the audio volume of the TV 130 (FIG. 3C). If desired, volume control gestures can be limited to particular positions or areas on the screen 112, such as the right-hand edge or side of the screen 112.

Further gesture examples are depicted in FIGS. 3D, 3E that involve three fingers or fingertips used to control media stream playback. As depicted in FIG. 3D, a pause/play gesture has the remote control 110 configured such that a user's tapping the screen 112 with three fingertips, such as the tips of the index, middle, and ring fingers, toggles the playback on the TV 130 between paused and play (on). As depicted in FIG. 3E, a stop/end-play gesture has the remote control 110 configured such that a user's double-tapping (two taps in rapid succession) the screen 112 with three fingertips stops the playback on the TV 130.

It can be seen that the number of fingers identified can be used to simplify the gesture matching carried out by a suitably programmed or configured electronic processor in the remote control 110 or other device in the network 100. In addition, this can make the gestures easier for a user to remember. For example, a user can more easily remember what the gestures are if all audio-related gestures involve two fingers, all stream-control-related gestures involve three fingers, all gestures for controlling the GUI on the remote control 110 involve one finger, etc.

Figure 4:
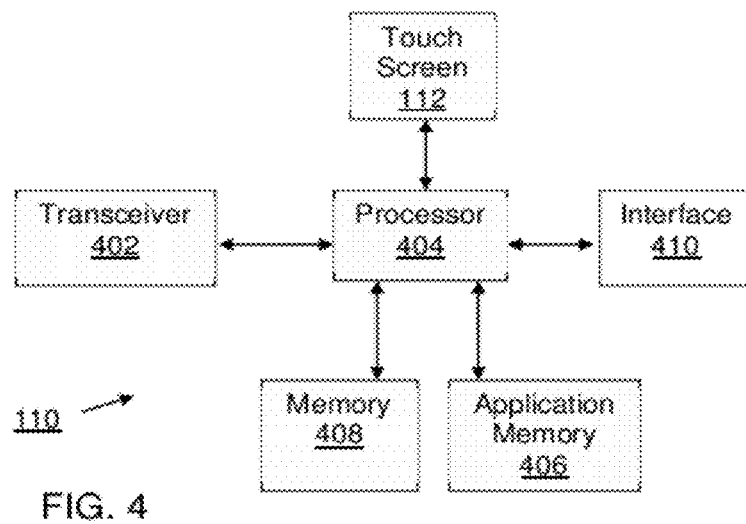
FIG. 4 is a block diagram of a remote control.

FIG. 4 is a block diagram of a typical remote control 110, such as a smart phone, tablet computer, etc., for controlling electronic devices as described in this application. The remote control 110 includes a transceiver 402 that is suitable for transmitting command signals to the IPTV Server 120 and TV 130 depicted in FIG. 1, and receiving signals from those devices. The command signals are generated by a suitably programmed electronic processor 404, which can include one or more sub-processors, and which executes one or more software modules and applications to carry out the operations of the remote control 110 described above. The transceiver 402 can also be used to communicate the application code executing in the processor. User input to the remote control 110 is provided through a touch- or proximity-sensitive screen or pad 112, and information can be presented to the user on the screen 110. Software applications can be stored in a suitable application memory 406, and the remote control can cache desired information in a suitable memory 408. The remote control 110 can also include an interface 410 that can be used to connect the remote control to other components, such as a computer, local or wide area network, etc.

Figure 5:
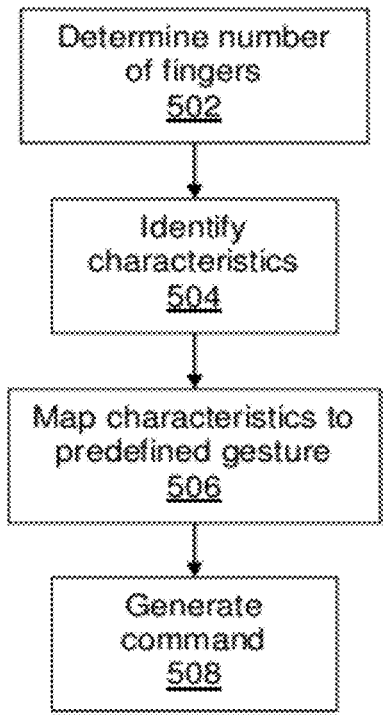
FIG. 5 is a flow chart of a method of controlling an electronic device.

A user inputs a gesture on the touch screen 112 that causes the processor 404, using information in the memories 406, 408, to generate suitable control command(s) and transmit the command(s) via the transmitter 402 to the appropriate electronic device 120, 130. Thus, as depicted in FIG. 5, the processor 404 and memories 406, 408 are configured or programmed to determine (step 502) the number of fingers touching the screen 112, and (step 504) to identify characteristics of action by the fingers on the screen 112. Characteristics advantageously include, but need not be limited to, type of movement, e.g., flick, slide, tap, double-tap, etc., and direction of movement, e.g., left, right, up, down, diagonal, curved (such as an arc, circle, and ellipse), etc. To identify a gesture such as those depicted in FIGS. 2 and 3, the processor 404 maps, or compares, the identified characteristics to predefined sets of characteristics for respective gestures (step 506). Based on the gesture having a set of characteristics that matches the identified characteristics, the processor generates a corresponding command to be sent (step 508). This command can be sent either directly to the TV 130 or to the IPTV Server 120. The processor 404 can indicate the transmitted command to the user via the screen 112.

With respect to step 502, it will be understood that spatial coordinates of fingers touching the screen 112 can be generated by the display itself, and used, e.g., counted, by the processor 404, such as the processor in an iPad or Galaxy Tab, to determine the number of fingers touching the screen and to identify characteristics of action by the fingers on the screen 112.

In steps 504 and 506, the processor 404 can identify characteristics of actions by the fingers on the screen in a number of suitable ways. An algorithm for identifying finger movement patterns executed by the processor can use, for example, data indicating the screen position, movement direction, and speed of each finger; respective distances between fingers; and patterns formed by the fingers, e.g., three fingers in a row. Such data can determined by simple tracking and/or filtering algorithms applied to the time-varying spatial coordinates of each finger, for example, that are provided by the screen 112. Various pattern recognition algorithms can be used to determine what pattern is drawn. In an example of a two-step process, finger movements can first be simply sorted based on, for example, the number of fingers used, an average total movement direction, an initial movement direction, an ending movement direction, start and end distances between fingers, etc., into predefined categories that respectively correspond to predefined gestures. After this first simple categorization step has been done, typically there are only one or a few gestures for the processor to choose from. In a second step if there is more than one pattern to choose from, the processor 404 can carry out a more computationally intensive pattern matching algorithm that more carefully categorizes finger movements and thereby enables selection between the remaining patterns. One or more predefined gestures are stored in memory as the finger characteristics described above and sets of coordinates that are used by the processor 404 for pattern matching.

It will be appreciated that suitable finger movement determination and pattern recognition algorithms for single fingers and styli are generally known. For example, the Palm personal digital assistant devices were among the first that reached the mass market, although the early Palm devices were single-touch rather than multi-touch as are the devices discussed above.

Figure 6:
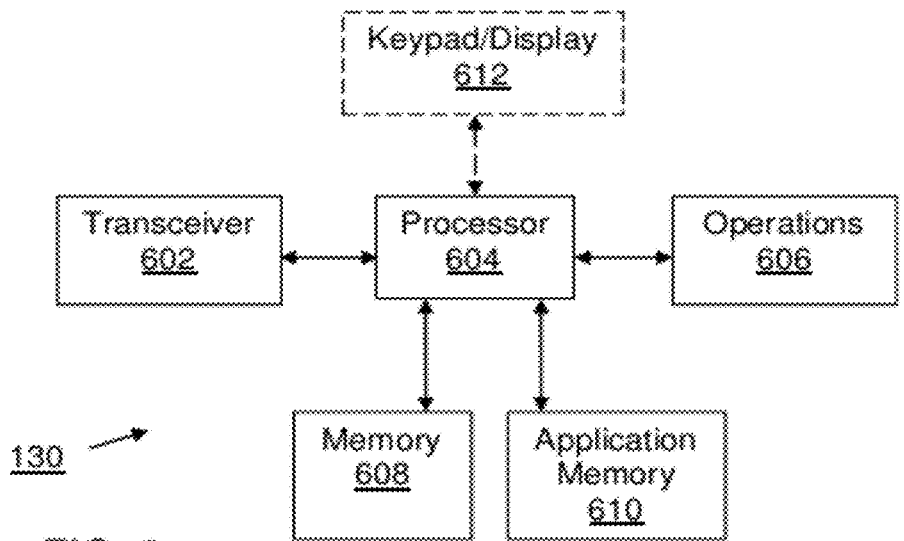
FIG. 6 is a block diagram of a TV used in an IPTV system.

FIG. 6 is a block diagram of a TV 130 for receiving control commands triggered by user gestures on the remote control 110 as described in this application. In the context of this application, the TV 130 can include any device that can interact with an IPTV system, e.g., an STB and a display, a TV with built-in STB functionality, etc. The TV 130 includes a transceiver 602 that is suitable for receiving the command signals transmitted by the remote control 110 and/or IPTV Server 120, and transmitting suitable signals. Received command signals are handled by a suitable electronic processor 604, which can include one or more sub-processors, and which executes one or more software modules and applications to carry out the operations of the TV 130 described above. In particular, the processor 604 carries out channel and volume changes and other adjustments (operations 606) that correspond to predefined gestures (see step 506) according to commands received from the remote control 110. The processor 604 can carry out the operations 606 with information stored in a suitable memory 608 and software applications that can be stored in a suitable application memory 610. It will be understood that the TV 130 can include a keypad/display 612 for user input/output to the processor 604.

Thus, in accordance with aspects of this invention, a method of controlling an IPTV system by gestures on a remote control includes (a) determining a number of fingers touching a screen of the remote control; (b) identifying at least one characteristic of movement by the fingers; (c) based on the determined number of fingers and the identified characteristic, finding a corresponding predefined gesture of a plurality of predefined gestures; and (d) based on the found gesture, generating a corresponding control command. The generated control command can be configured to be sent to a TV and/or an IPTV Server.

In accordance with further aspects of this invention, a remote control for controlling an IPTV system includes a touch-sensitive screen; a programmable electronic processor in communication with the touch-sensitive screen; and a transmitter in communication with the programmable electronic processor. The processor is configured to determine a number of fingers touching the touch-sensitive screen, to identify at least one characteristic of movement by the fingers on the screen, to match the determined number and identified characteristic to a predefined gesture pattern, and to generate based on the match a corresponding control command. The generated control command can be configured to be sent to a TV and/or an IPTV Server.

Figure 7:
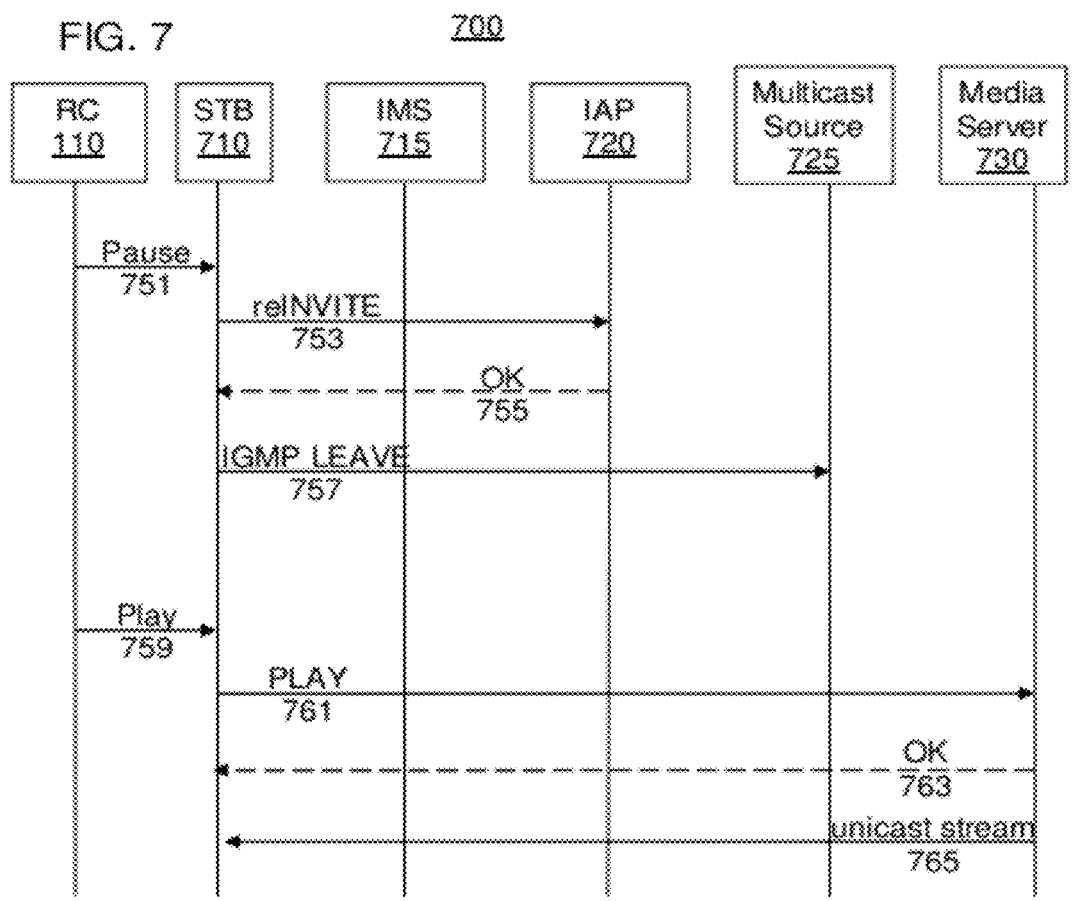
FIG. 7 is a diagram of a communication system and a signal flow in the system.

To illustrate further the operation of the invention, FIG. 7 depicts a communication network 700 and a signal flow among communication network entities for pausing and resuming a media stream in an IPTV system as described above. FIG. 7 shows the signal flow that takes place in a transition from multicast transmission to unicast transmission in connection with pausing a live media stream, which can be called a network time-shift. As depicted, the network 700 includes a remote control 110 and an STB 710 on the user, or client side, and an IMS 715, an IPTV Application Platform (IAP) 720, and a Multicast Source 725 and Media Server 730 on the network side. It will be appreciated that the IAP 720 acts in general as an IPTV control server on the network side, and that messaging protocols other than those described below can be used for communication among the entities in the network 700.

With a broadcast media stream from the Multicast Source 725 already set up in a suitable way, the user pauses the stream by making a suitable gesture or gestures on the remote control's screen, which sends a Pause message (step 751) to the STB 710. In response, the STB 710 sends (step 753) a SIP reINVITE message to the IAP 720, which includes SDP relevant information for restarting the media stream as a unicast stream on another channel. It will be appreciated that when in a session, a SIP reINVITE message would typically be used, although a "dummy" INVITE message, i.e., an empty INVITE message, could be used instead. According to the protocols, the IAP 720 replies (step 755) with a SIP 200 OK message that includes a time offset in the program of the pause, and the STB 710 sends (step 757) an Internet Group Management Protocol (IGMP) LEAVE message to the Multicast Source 725, which includes other-channel information for re-starting the paused stream. IGMP is used by IP hosts to manage IP multicast groups and by connected routers to discover group members for streaming video and other content. IGMP version 1 is defined by RFC 1112, IGMP version 2 is defined by RFC 2236, and IGMP version 3 is defined by RFC 3376.

The user can begin receiving the paused media stream by making a suitable gesture or gestures on the touch screen of the RC 110, which sends a Play message (step 759) to the STB 710. In response, the STB 710 sends (step 761) a Real-Time Streaming Protocol (RTSP) PLAY message to the Media Server 730 that includes suitable information needed for restarting the paused and recorded multicast stream as a unicast stream. Such information can include a uniform resource identifier (URI) indicating the desired stream, a session identification (ID), and the time offset value that indicates when the pause occurred. According to the protocols, the Media Server 730 sends (step 763) an RTSP 200 OK message to the STB 710, and the unicast stream of the paused recorded program is provided (step 765).

It will be appreciated that procedures described above are carried out repetitively as necessary, for example, to respond to the time-varying nature of communication signals exchanged by transmitters and receivers. Assemblies implementing this invention can be included in, for example, computers, servers, wireless communication network base stations, and the like.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above, and all such forms are contemplated to be within the scope of the invention.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

The invention claimed is:

1. A method of controlling an Internet Protocol Television (IPTV) system by gestures on a remote control, comprising:
   (a) determining a number of fingers touching a screen of the remote control;
   (b) identifying at least one characteristic of action by the fingers;
   (c) mapping at least one identified characteristic of action by the fingers to a corresponding predefined gesture in a set of predefined gestures; and
   (d) based on the gesture mapped in (c), generating a corresponding control command to be sent to the IPTV system; wherein the control command includes at least one of a PAUSE command and a PLAY command; the PAUSE command includes a session initiation protocol message that comprises a reINVITE message or an INVITE message and session description protocol information for restarting a multicast media stream as a unicast stream; and the PLAY command includes a real-time streaming protocol PLAY message that includes information for starting or restarting a multicast media stream as a unicast stream that includes at least a uniform resource identifier indicating a desired stream and a session identification.

2. The method of claim 1, wherein identifying at least one characteristic comprises identifying a type of movement and a direction of movement; the type of movement includes a flick, a slide, a tap, and a double-tap; and the direction of movement includes left, right, up, down, diagonal, and curved on the screen.

3. The method of claim 2, wherein the control command corresponding to a tap of three fingers toggles the IPTV system between pause and play of a media stream.

4. The method of claim 2, wherein the control command corresponding to a double-tap of three fingers causes the IPTV system to end play of a media stream.

5. The method of claim 1, wherein the at least one characteristic is identified based on data indicating at least one of screen position, movement direction, and speed of each finger; respective distances between fingers; and spatial patterns formed by the fingers.

6. The method of claim 1, wherein mapping the at least one identified characteristic includes sorting the at least one identified characteristic into at least one predefined category that corresponds to a predefined gesture.

7. The method of claim 6, wherein the at least one identified characteristic is sorted based on at least one of a number of fingers used, an average total movement direction, an initial movement direction, an ending movement direction, and start and end distances between fingers.

8. A remote control for controlling an Internet Protocol Television (IPTV) system, comprising:
a touch-sensitive screen;
a programmable electronic processor in communication with the touch-sensitive screen; and
a transceiver in communication with the programmable electronic processor;
wherein the processor is configured to determine a number of fingers touching the touch-sensitive screen, to identify at least one characteristic of action by the fingers touching the screen, to map at least one identified characteristic of action by the fingers to a corresponding predefined gesture in a set of predefined gestures, and to generate based on the mapped gesture a corresponding control command; and
the control command includes at least one of a PAUSE command and a PLAY command; the PAUSE command includes a session initiation protocol message that comprises a reINVITE message or an INVITE message and session description protocol information for restarting a multicast media stream as a unicast stream; and the PLAY command includes a real-time streaming protocol PLAY message that includes information for starting or restarting a multicast media stream as a unicast stream that includes at least a uniform resource identifier indicating a desired stream and a session identification.

9. The remote control of claim 8, wherein the processor is configured to identify at least one characteristic of action by at least identifying a type of movement and a direction of movement; the type of movement includes a flick, a slide, a tap, and a double-tap; and the direction of movement includes left, right, up, down, diagonal, and curved on the screen.

10. The remote control of claim 9, wherein the control command corresponding to a tap of three fingers toggles the IPTV system between pause and play of a media stream.

11. The remote control of claim 9, wherein the control command corresponding to a double-tap of three fingers causes the IPTV system to end play of a media stream.

12. The remote control of claim 8, wherein the processor is configured to identify the at least one characteristic based on data indicating at least one of screen position, movement direction, and speed of each finger; respective distances between fingers; and spatial patterns formed by the fingers.

13. The remote control of claim 8, wherein the processor is configured to map the at least one identified characteristic by at least sorting the at least one identified characteristic into at least one predefined category that corresponds to a predefined gesture.

14. The remote control of claim 13, wherein the at least one identified characteristic is sorted based on at least one of a number of fingers used, an average total movement direction, an initial movement direction, an ending movement direction, and start and end distances between fingers.

15. A non-transitory computer-readable medium having stored instructions that, when executed by a computer, cause the computer to carry out a method of controlling an Internet Protocol Television (IPTV) system by gestures on a remote control, wherein the method comprises:
(a) determining a number of fingers touching a screen of the remote control;
(b) identifying at least one characteristic of action by the fingers;
(c) mapping at least one identified characteristic of action by the fingers to a corresponding predefined gesture in a set of predefined gestures; and
(d) based on the gesture mapped in (c), generating a corresponding control command to be sent to the IPTV system; wherein the control command includes at least one of a PAUSE command and a PLAY command; the PAUSE command includes a session initiation protocol message that comprises a reINVITE message or an INVITE message and session description protocol information for restarting a multicast media stream as a unicast stream; and the PLAY command includes a real-time streaming protocol PLAY message that includes information for starting or restarting a multicast media stream as a unicast stream that includes at least a uniform resource identifier indicating a desired stream and a session identification.

16. The non-transitory medium of claim 15, wherein identifying at least one characteristic comprises identifying a type of movement and a direction of movement; the type of movement includes a flick, a slide, a tap, and a double-tap; and the direction of movement includes left, right, up, down, diagonal, and curved on the screen.

17. The non-transitory medium of claim 16, wherein the control command corresponding to a tap of three fingers toggles the IPTV system between pause and play of a media stream.

18. The non-transitory medium of claim 16, wherein the control command corresponding to a double-tap of three fingers causes the IPTV system to end play of a media stream.

19. The non-transitory medium of claim 15, wherein the at least one characteristic is identified based on data indicating at least one of screen position, movement direction, and speed of each finger; respective distances between fingers; and spatial patterns formed by the fingers.

20. The non-transitory medium of claim 15, wherein mapping the at least one identified characteristic includes sorting the at least one identified characteristic into at least one predefined category that corresponds to a predefined gesture.

21. The non-transitory medium of claim 20, wherein the at least one identified characteristic is sorted based on at least one of a number of fingers used, an average total movement direction, an initial movement direction, an ending movement direction, and start and end distances between fingers.

* * * * *